United States Patent
Souwa et al.

(10) Patent No.: US 8,522,931 B2
(45) Date of Patent: Sep. 3, 2013

(54) DISK BRAKE ROTOR

(75) Inventors: Makoto Souwa, Sakai (JP); Toru Iwai, Sakai (JP)

(73) Assignee: Shimano Inc., Osaka (JP)

( * ) Notice: Subject to any disclaimer, the term of this patent is extended or adjusted under 35 U.S.C. 154(b) by 418 days.

(21) Appl. No.: 12/750,106

(22) Filed: Mar. 30, 2010

(65) Prior Publication Data

US 2011/0240420 A1    Oct. 6, 2011

(51) Int. Cl.
     *F16D 65/12*      (2006.01)

(52) U.S. Cl.
     USPC ............ 188/218 XL; 188/18 A; 188/218 R

(58) Field of Classification Search
     USPC ........ 188/218 XL, 218 R, 18 A, 17; 301/6.1, 301/6.8
     See application file for complete search history.

(56) References Cited

U.S. PATENT DOCUMENTS

| | | | |
|---|---|---|---|
| 4,742,948 A * | 5/1988 | Fisher et al. | 228/119 |
| 5,626,211 A * | 5/1997 | Gewelber et al. | 188/218 XL |
| 6,079,611 A | 6/2000 | Nakamura et al. | |
| 7,416,060 B2 | 8/2008 | Takizawa | |
| 7,424,938 B2 | 9/2008 | Souwa | |
| 2005/0006186 A1 | 1/2005 | Iwai et al. | |
| 2006/0037819 A1 | 2/2006 | Takizawa | |
| 2008/0060891 A1 | 3/2008 | Chen et al. | |
| 2008/0179147 A1 * | 7/2008 | DeBeer et al. | 188/218 XL |

FOREIGN PATENT DOCUMENTS

| | | |
|---|---|---|
| DE | 10104039 A1 | 8/2002 |
| DE | 202004005284 U1 | 8/2004 |
| DE | 60120262 T2 | 9/2006 |
| TW | 1318188 B | 12/2009 |
| WO | 02/31376 A1 | 4/2002 |
| WO | 03/064882 A1 | 8/2003 |

\* cited by examiner

*Primary Examiner* — Pamela Rodriguez
(74) *Attorney, Agent, or Firm* — Global IP Counselors

(57) ABSTRACT

A disk brake rotor includes a first rotor portion, a second rotor portion and a third rotor portion. The second rotor portion has an annular portion and at least one ventilation hole. The third rotor portion also has an annular portion. The first portion is attached to and disposed between the second rotor portion and the third rotor portions, such that a surface of the first rotor portion is an exposed area exposed by the at least one ventilation hole.

13 Claims, 19 Drawing Sheets

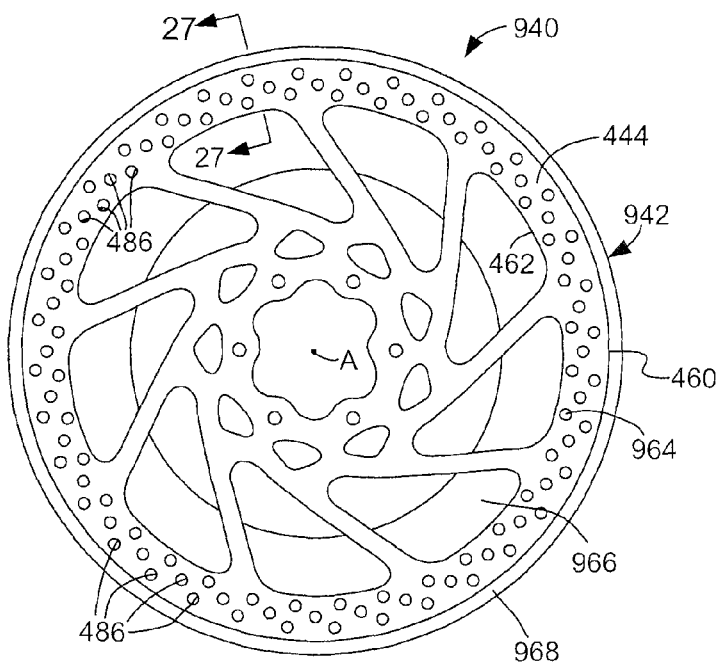
FIG. 26
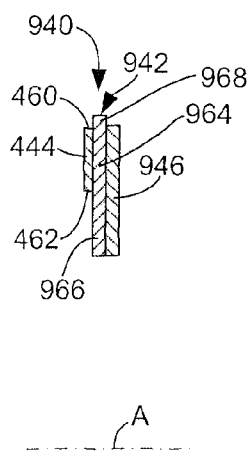
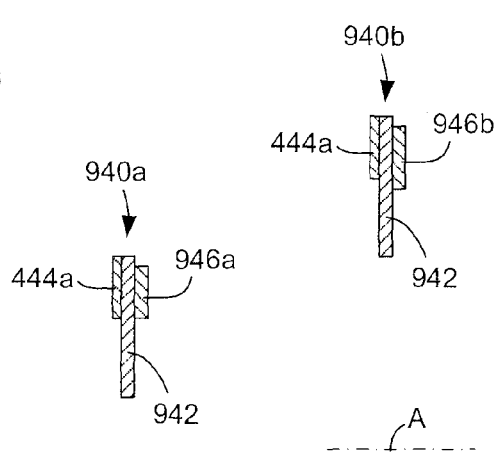
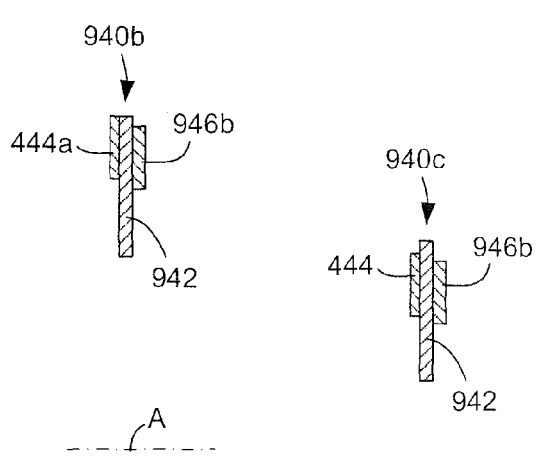
FIG. 27
FIG. 28
FIG. 29
FIG. 30

DISK BRAKE ROTOR

BACKGROUND

1. Field of the Invention

This invention generally relates to a disk brake rotor. More specifically, the present invention relates to disk brake rotor with exposed surfaces that provide disk brake rotor cooling.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

SUMMARY

One aspect is to provide a disk brake rotor with exposed surfaces that can dissipate heat.

In view of the state of the known technology, a disk brake rotor includes a first rotor portion, a second rotor portion and a third rotor portion. The second rotor portion has an annular portion and at least one ventilation hole. The third rotor portion also has an annular portion. The first portion is attached to and disposed between the second rotor portion and the third rotor portions, such that a surface of the first rotor potion is an exposed area exposed by the at least one ventilation hole.

BRIEF DESCRIPTION OF THE DRAWINGS

Referring now to the attached drawings which form a part of this original disclosure:

FIG. 26 is a side view of a disk brake rotor in accordance with a twelfth embodiment;

FIG. 27 is a cross-sectional view of the disk brake rotor taken along the line 27-27 in FIG. 26 in accordance with the twelfth embodiment;

FIG. 28 a cross-sectional view of a disk brake rotor similar to FIG. 27 in accordance with a thirteenth embodiment;

FIG. 29 a cross-sectional view of a disk brake rotor similar to FIG. 27 in accordance with a fourteenth embodiment; and FIG. 30 a cross-sectional view of a disk brake rotor similar to FIG. 27 in accordance with a fifteenth embodiment.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
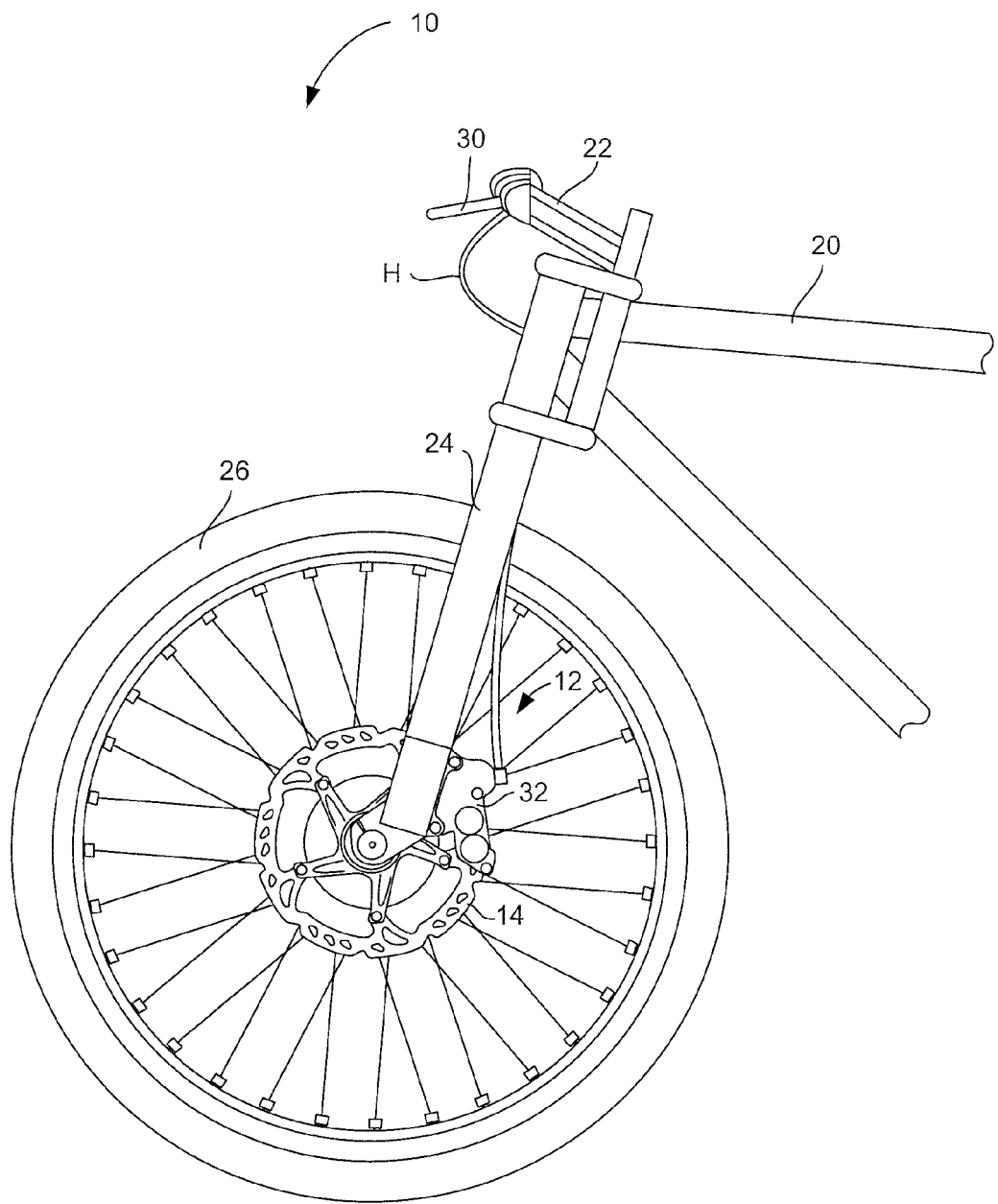
FIG. 1 is a side elevational view of a bicycle including a front wheel that is equipped with disk brakes having a disk brake rotor in accordance with one embodiment.

Referring initially to FIG. 1, a bicycle 10 is illustrated with a hydraulic disk brake system 12 that includes a rotor assembly 14, in accordance with a first embodiment.

The bicycle 10 includes a frame 20, handlebars 22, a front fork 24, a front wheel 26 and the hydraulic disk brake system 12.

Figure 2:
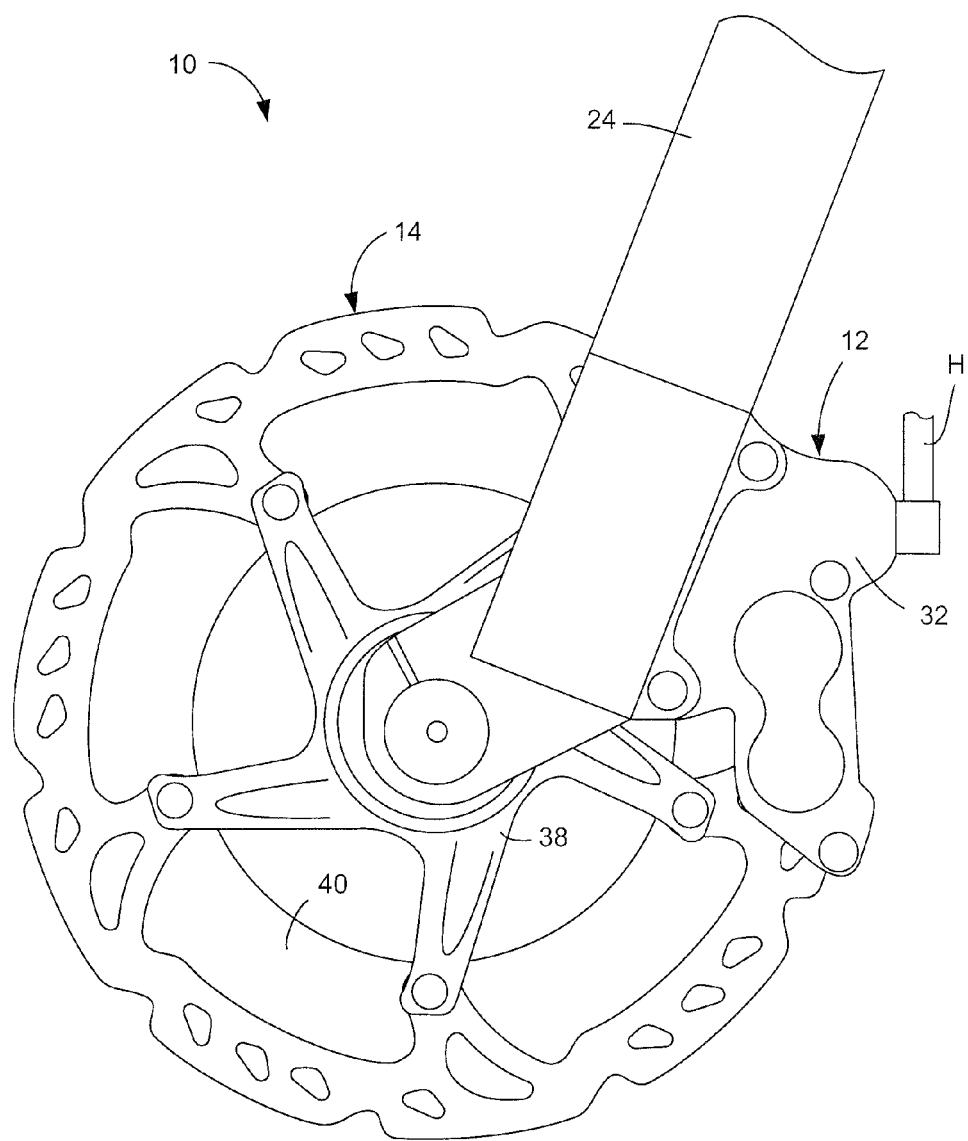
FIG. 2 is a side elevational view of caliper assembly and the disk brake rotor depicted in FIG. 1, showing the general shape of the disk brake rotor in accordance with the first embodiment.

The disk brake system 12 includes a hydraulic brake actuation mechanism 30 (FIG. 1), a hydraulic caliper assembly 32 (FIGS. 1, 2 and 3) and the rotor assembly 14.

Figure 3:
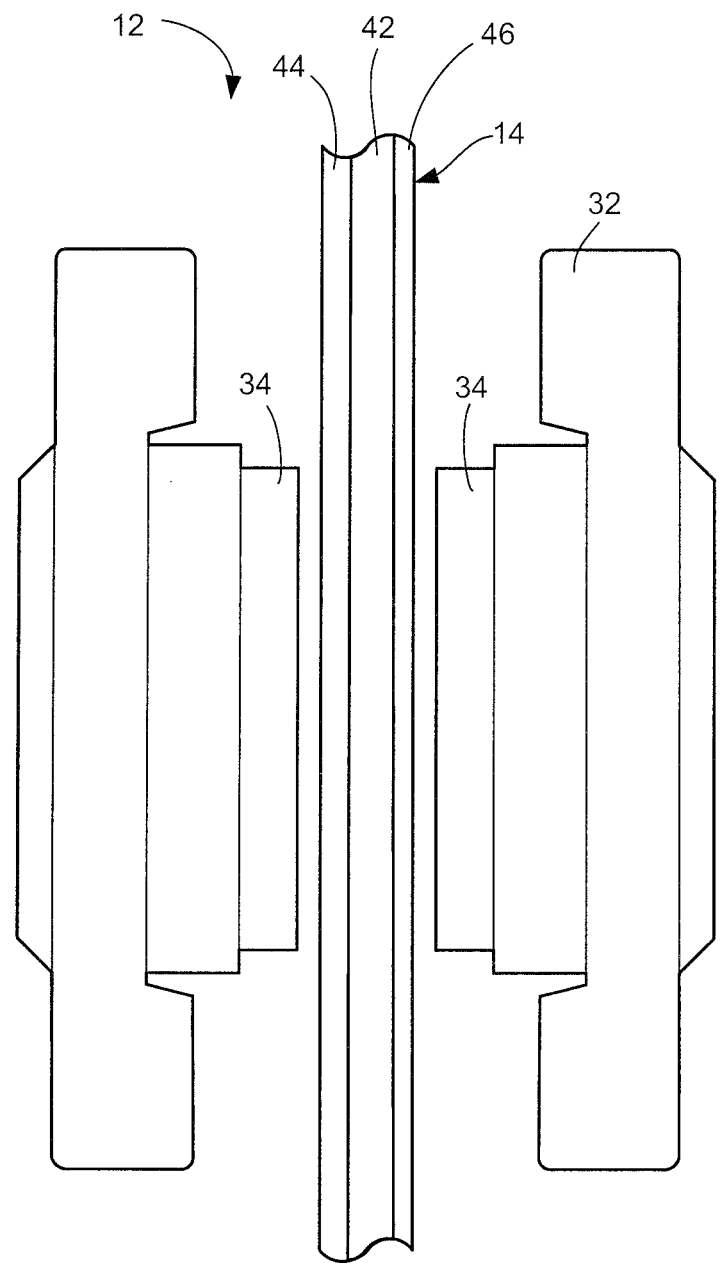
FIG. 3 is rear view of the caliper assembly showing a portion of outer annular edge of the disk brake rotor in accordance with the first embodiment.

As shown in FIG. 3, the hydraulic caliper assembly 32 is a conventional caliper device that includes conventional brake pads 34. The hydraulic brake actuation mechanism 30 (FIG. 1) is operably connected to the hydraulic caliper assembly 32 by a hydraulic hose or hydraulic line H. In response to operation of the hydraulic brake actuation mechanism 30, hydraulic fluid passing through the hydraulic line H causes the hydraulic caliper assembly 32 to move the brake pads 34 and press against opposite sides of the rotor assembly 14 in a conventional manner. Contact between the brake pads 34 and surfaces of the brake disk rotor 14 generate friction thereby providing braking force to the front wheel 26 of the bicycle 10.

A description of the rotor assembly 14 is now provided with specific reference to FIGS. 4-9. The rotor assembly 14 includes a hub mounting portion 38, and a disk brake rotor 40 that has a first rotor portion 42, a second rotor portion 44 and a third rotor portion 46.

As best shown in FIGS. 4-6, 8 and 9, the hub mounting portion 38 has a central annular section 50 that includes internal splines 52. The central annular section 50 is configured to attach to a hub portion (not shown) of the wheel 26 in a conventional manner. More specifically, the internal splines 52 ensure that the rotor assembly 14 is fixed to the wheel 26 such that the wheel 26 and the rotor assembly 14 rotate as a single monolithic unit in a conventional manner. Hence, when the disk brake system 12 is operated to provide braking force against rotation of the wheel 26, engagement between the brake pads 34 and the rotor assembly 14 causes the wheel 26 to slow down and stop.

Figure 4:
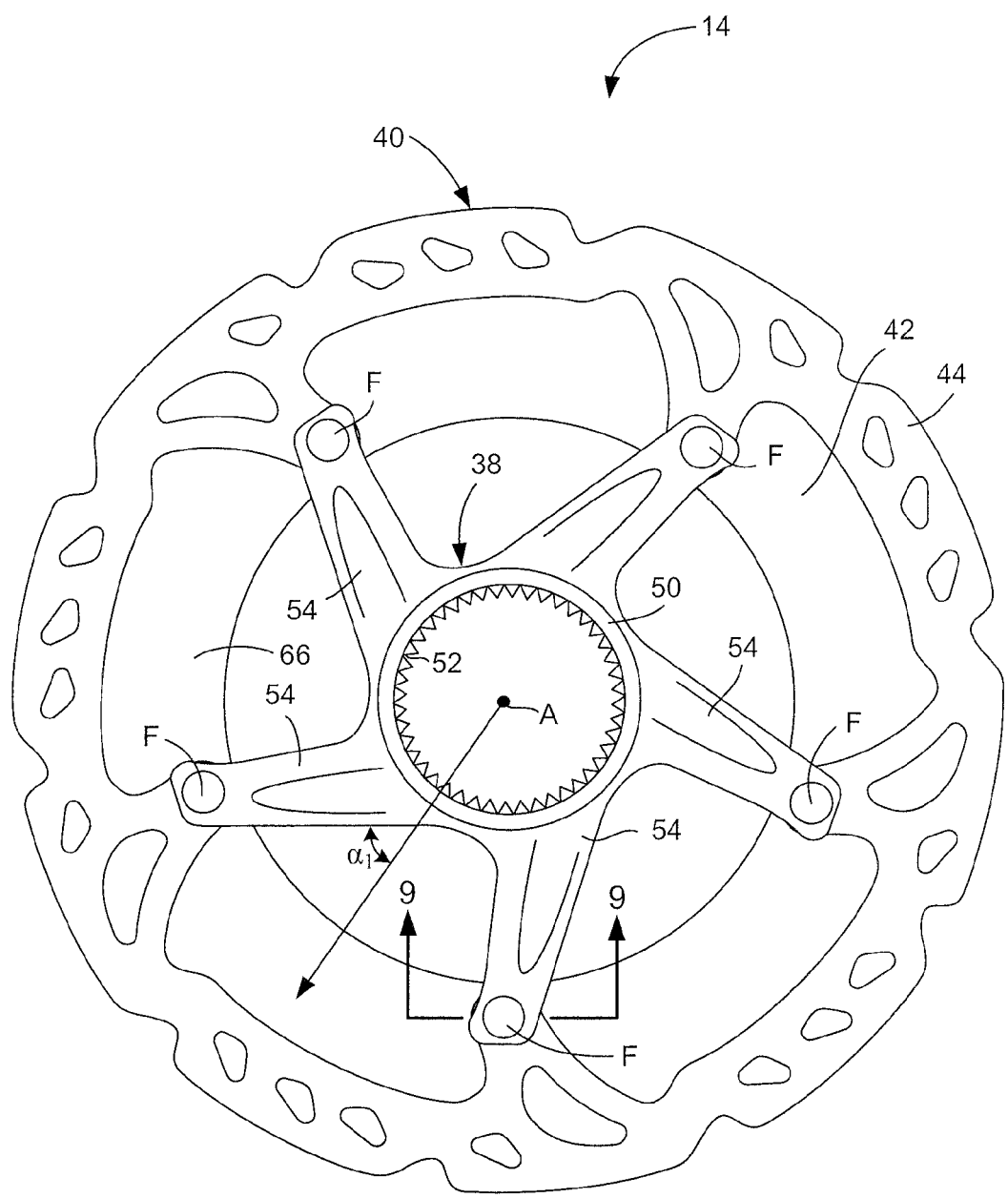
FIG. 4 is a side view of the disk brake rotor shown removed from the bicycle, showing a first portion, a second portion and a hub mounting member in accordance with the first embodiment.
Figure 5:
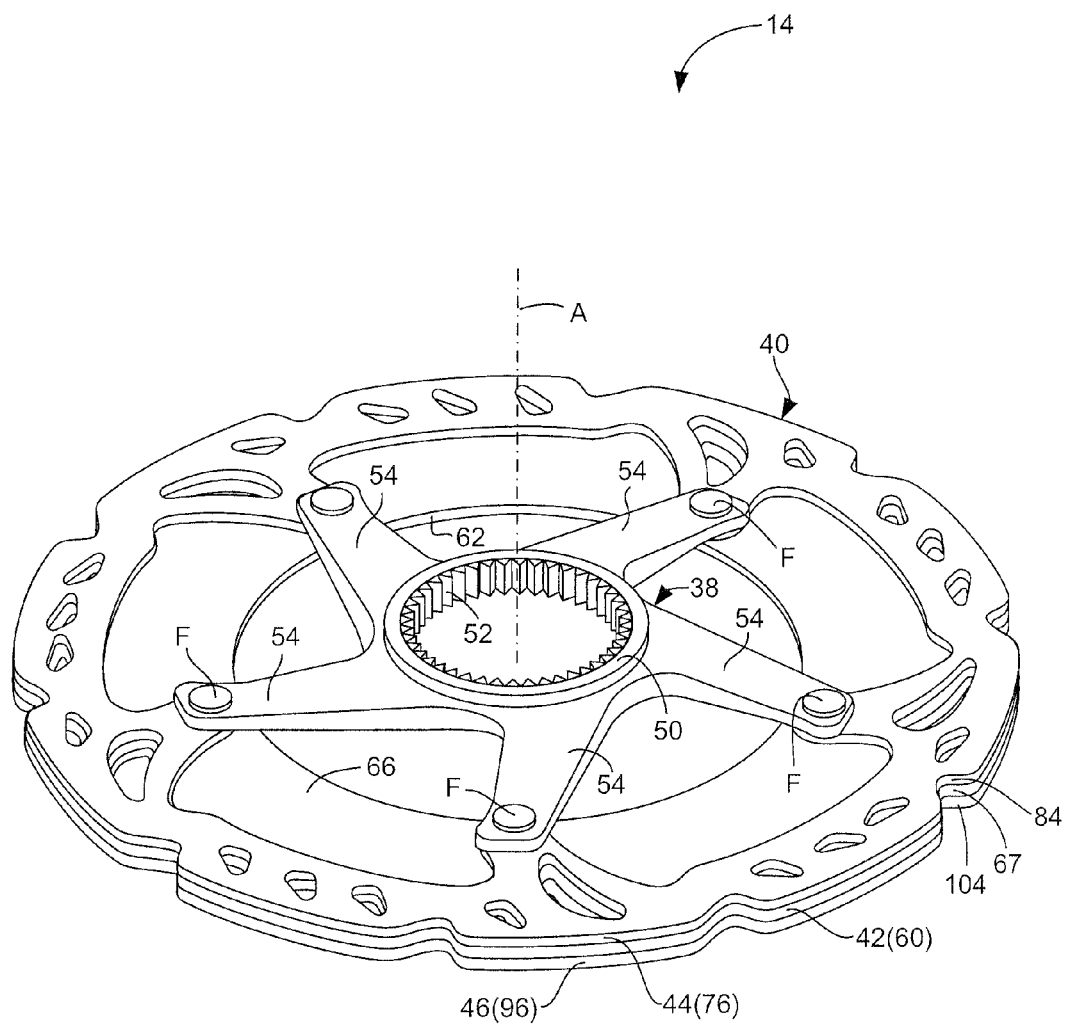
FIG. 5 is a perspective view of the disk brake rotor shown removed from the bicycle, showing the first portion, the second portion, the hub mounting member and an edge of a third portion in accordance with the first embodiment.
Figure 6:
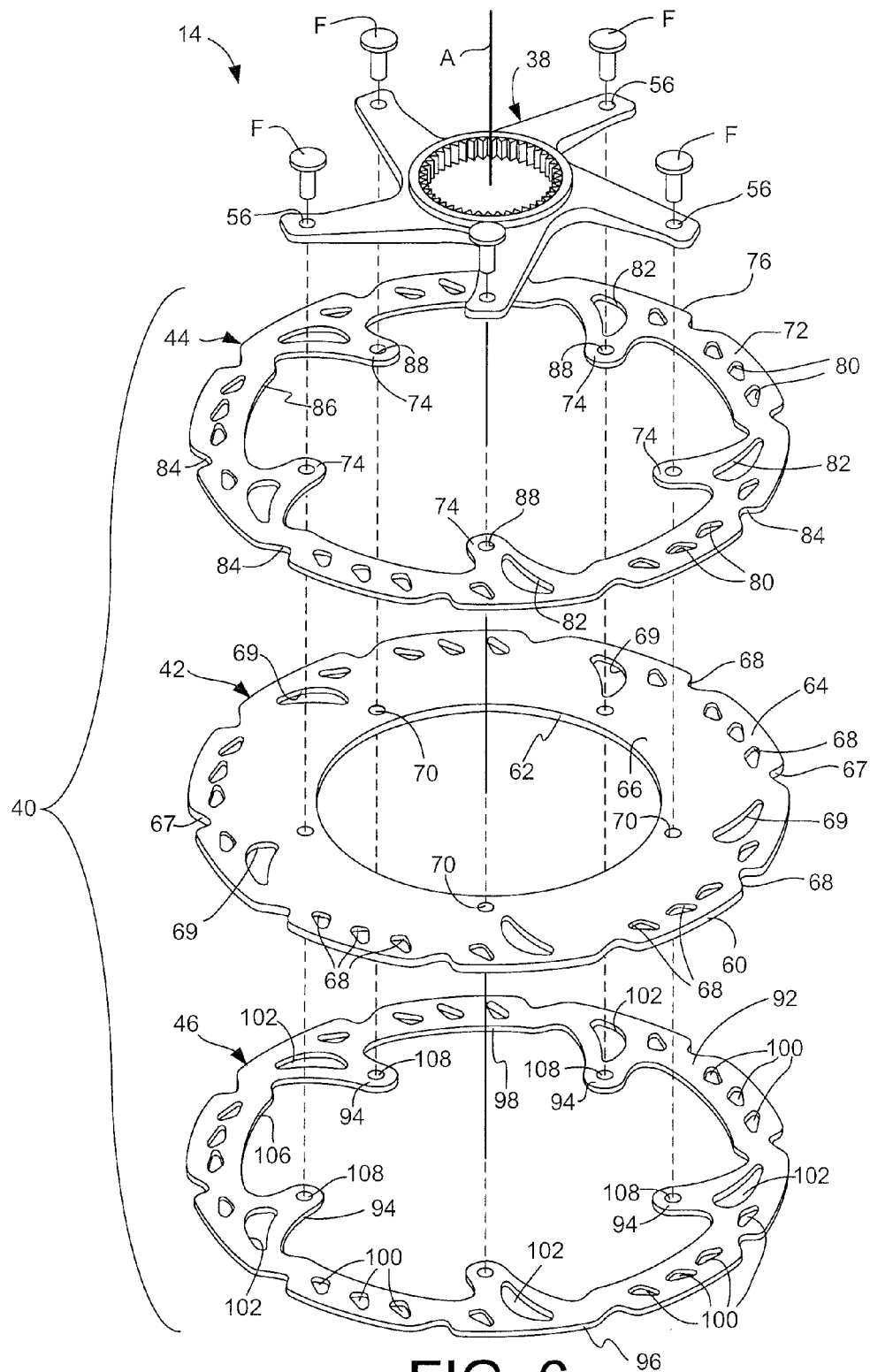
FIG. 6 is an exploded perspective view of the disk brake rotor, showing the first portion, the second portion, the third portion and the hub mounting member, with the first, second and third portions all having ventilation holes, in accordance with the first embodiment.
Figure 8:
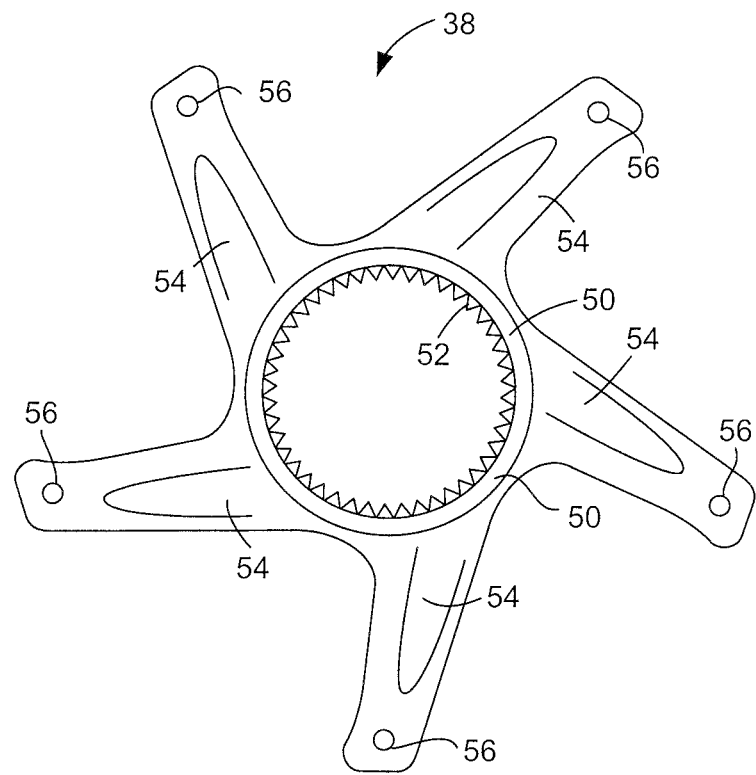
FIG. 8 is a side view of the hub mounting member shown removed from the disk brake rotor in accordance with the first embodiment.

As best shown in FIGS. 4, 6 and 8, the hub mounting portion 38 of the rotor assembly 14 also includes a plurality of arm sections 54 that extend radially outwardly from the central annular section 50. In the depicted embodiment there are five of the arm sections 54. However, the number of arm sections 54 is not limited to five. For example, four, six or more arm sections 54 can be provided on the central annular section 50. As indicated in FIG. 4, the arm sections 54 are angled with respect to a line $L_1$ extending normal (perpendicular) to a central rotational axis A. Specifically, the arm sections 54 are angularly offset from the line $L_1$ by an angle $\alpha_1$ shown in FIG. 4. The angular offset of the arm sections 54 is provided to ensure that the hub mounting portion 38 can adequately sustain the dynamic forces associated with torque generated during braking. However, the orientation of the arm sections 54 can also increase air flow about the rotor assembly 14 to enhance heat dissipation. Each of the angular offset arm sections 54 includes an aperture 56 (FIGS. 6, 8 and 9) dimensioned to receive fasteners F. The fasteners F fix the hub mounting portion 38 to the disk brake rotor 40 and more specifically, to the first, second and third rotor portions 42, 44 and 46.

A description of the disk brake rotor 40 of the disk brake assembly 14 is now provided with specific reference to FIGS. 4-7 and 9.

As best shown in FIG. 6, the first rotor portion 42 of the disk brake rotor 40 has an overall annular shape with a radially outer surface 60 and a radially inner surface 62. The annular shape of the first rotor portion 42 defined by a radially outer section 64 and a radially inner section 66.

Figure 7:
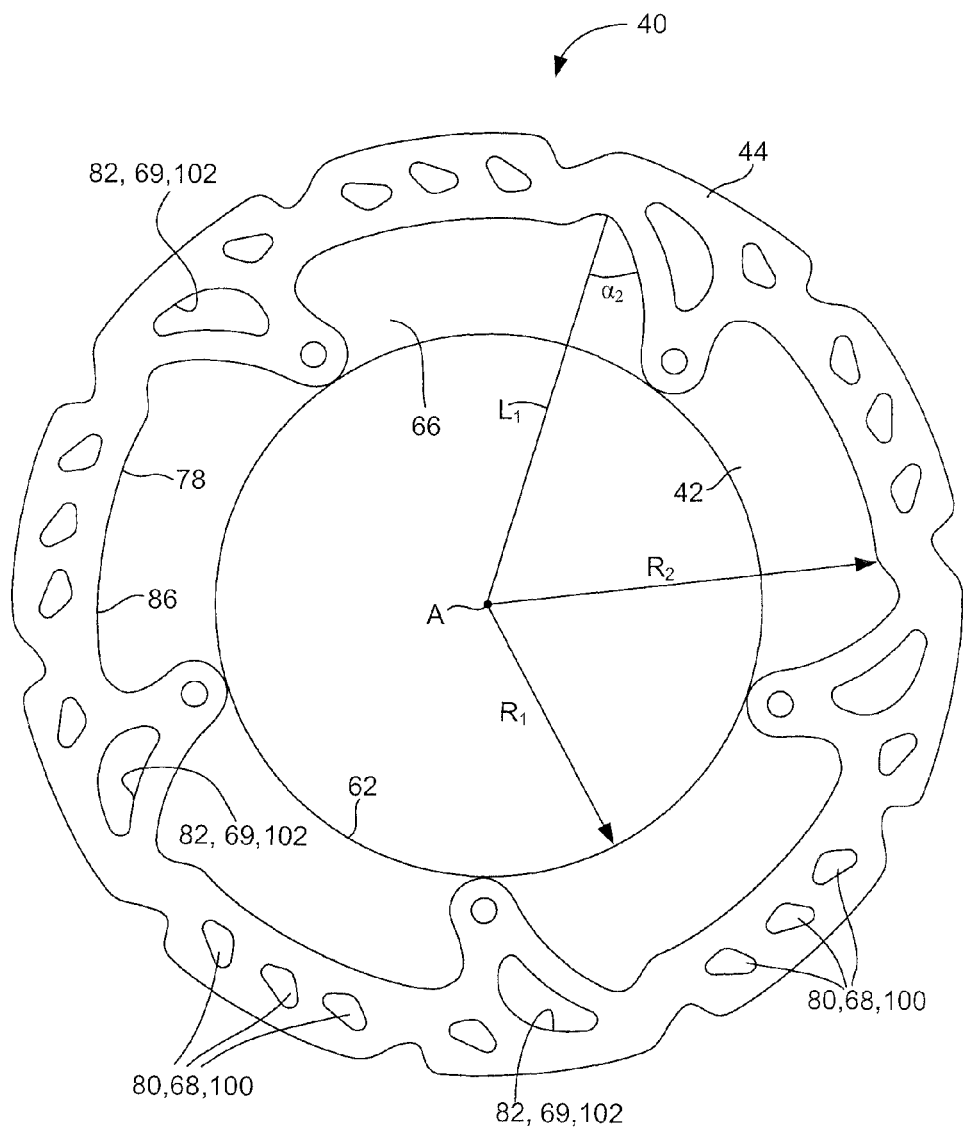
FIG. 7 is a side view of the disk brake rotor with the hub mounting portion removed, showing a first portion and a second portion in accordance with the first embodiment.

The outer surface 60 is basically an outer edge of the first rotor portion 42. The outer surface 60 has an overall circular shape with a plurality of curved notches 67. The inner surface 62 is basically an inner edge of the first rotor portion 42 and in the first embodiment has a round shape. The inner surface 62 has a radius $R_1$, as shown in FIG. 7 measured relative to an axis A of rotation of the disk brake rotor 40 and the rotor assembly 14.

Figure 9:
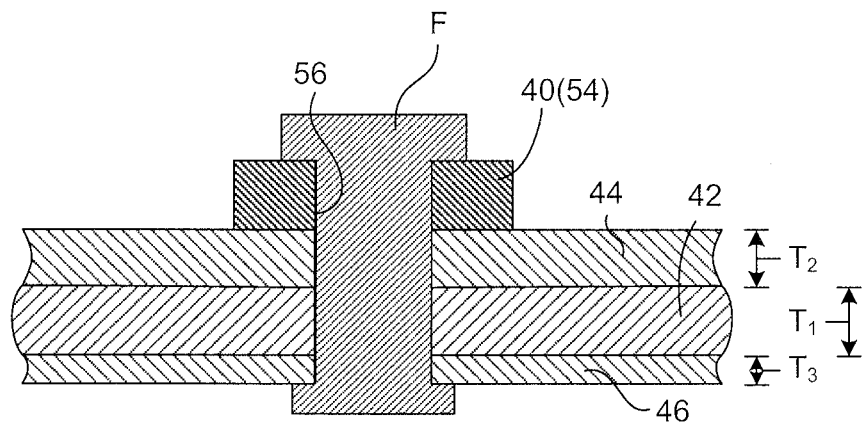
FIG. 9 is a cross-sectional view taken along the line 9-9 in FIG. 4, showing the relative thicknesses of the first, second and third portions of the disk brake rotor in accordance with the first embodiment.

The outer section 64 corresponds to the area of the first rotor portion 42 that attaches to the second and third rotor portion 44 and 46. The outer section has two opposite surfaces that include a plurality of small ventilation apertures 68 and a plurality of large ventilation apertures 69 (described in greater detail below with respect the second and third rotor portions 44 and 46). Each opposite surface of the outer section 64 is fixed to a respective one of the second rotor portion 44 and the third rotor portion 46, as described in greater detail below. Consequently, the outer section 64 is covered by the second rotor portion 44 and the third rotor portion 46 and is hidden from view in FIGS. 4, 5 and 7. The inner section 66 of the first rotor portion 42 includes a plurality of apertures 70 that receive the fasteners F, as indicated in FIGS. 6 and 9. The inner section 66 is also at least partially exposed when the second rotor portion 44 and the third rotor portion 46 are fixed to the first rotor portion 42, as described in greater detail below. Hence, the inner section 66 is visible in FIGS. 4, 5 and 7. Further, the visible surfaces of the inner section 66 are exposed surfaces or exposed areas of the first rotor portion 42 that help to dissipate heat. The exposed areas of the first rotor portion 42 are located on an annular portion of the first rotor portion 42 and extend radially inward from annular portions of the second rotor portion 44 and the third rotor portion 46, as described in greater detail below.

As best shown in FIG. 6, the second rotor portion 44 of the disk brake rotor 40 basically includes an annular portion 72 and a plurality of projections 74. The annular portion 72 has a radially outer surface 76, a radially inner surface 78, a plurality of small ventilation holes 80 and a plurality of large ventilation holes 82. The outer surface 76 is basically an outer edge of the second rotor portion 44 and includes a plurality of curved notches 84. In the first embodiment, the curved notches 84 are aligned with the curved notches 68 of the first rotor portion 42. The annular portion 72 has an inner radius $R_2$, such that the inner radius $R_2$ is larger than the inner radius $R_1$ of the first rotor portion 42, as shown in FIG. 7. The inner surface 78 includes curved sections that extend between adjacent ones of the plurality of projections 74. The inner surface 78 and the projections 74 basically define a single ventilation hole 86 that spans the center region of the second rotor portion 44.

Each of the projections 74 includes an aperture 88 dimensioned to receive the fasteners F, as indicated in FIGS. 6 and 9. Further, the projections 74 are angularly offset from the line $L_1$ by an angle $\alpha_2$ as indicated in FIG. 7.

As best shown in FIG. 6, in the first embodiment, the third rotor portion 46 is similar to the second rotor portion 46 in that the third rotor portion 46 has an annular portion 92 and a plurality of projections 94. The annular portion 92 has a radially outer surface 96, a radially inner surface 98, a plurality of small ventilation holes 100 and a plurality of large ventilation holes 102. The outer surface 96 is basically an outer edge of the third rotor portion 46 and includes a plurality of curved notches 104. In the first embodiment, the curved notches 104 are aligned with the curved notches 68 of the first rotor portion 42 and the curved notches 84 of the second rotor portion 44. The inner surface 98 includes curved portions that extend between adjacent ones of the plurality of projections 94. The inner surface 98 and the projections 94 basically define a single ventilation hole 106 that spans the center region of the third rotor portion 46.

Each of the projections 94 includes an aperture 108 dimensioned to receive the fasteners F, as indicated in FIGS. 6 and 9. Further, the projections 94 are angularly offset from the line $L_1$ by the angle $\alpha_2$ in parallel with the projections 74 of the second rotor portion 44.

The disk brake rotor 40 is manufactured in a manner that is similar to or the same as that disclosed in U.S. Patent Application Publication No. 2006/0037819. Specifically, the second rotor portion 44 and the third rotor portion 46 are laminated to opposing sides of the outer section 64 of the first rotor portion 42. Thus, one side (surface) of the outer section 64 defines a first attachment area that attaches to the annular portion 72 of the second rotor portion 44 and the opposite side (opposite surface) of the outer section 64 of the first rotor portion 42 defines a second attachment area that attaches to the annular portion 92 of the third rotor portion 46.

The ventilation holes 68, 69, 80, 82, 100 and 102 are all simultaneously punched out after lamination. Further, the curved notches 67, 84 and 104 are similarly machined or punched out after lamination. Thereafter, the hub mounting portion 38 is attached to the disk brake rotor 40 by installation of the fasteners F. The fasteners F can be rivets with one deformed end, bolts, or any other suitable fastening device. However, it should be understood from the drawings and the description herein, that other methods can be used to manufacture and assemble the disk assembly 14. Since methods of manufacture of multi-layered or laminated disk brake rotors are well known, further description of the method of manufacturing the rotor assembly 14 is omitted for the sake of brevity.

In the depicted embodiment, the first rotor portion 42 is made of a light weight metal material, for example, aluminum or an aluminum alloy. The second rotor portion 44 and the third rotor portion 46 are made of a material that is suitable for brake pad contact such as, for example, stainless steel.

As indicated in FIG. 9, the first rotor portion 42 has a thickness $T_1$, the second rotor portion 44 has a thickness $T_2$ and the third rotor portion 46 has a thickness $T_3$. As is also indicated in FIG. 9, the thickness $T_1$ is greater than the thicknesses $T_2$ and $T_3$ and the thickness $T_2$ is greater than the thickness $T_3$. In the depicted embodiment, the thickness $T_1$ is 0.78 mm, the thickness $T_2$ is 0.63 mm and the thickness $T_3$ is 0.32 mm. Consequently, the first rotor portion 42 has the first thickness $T_1$ that is different from the second thickness $T_2$ of the second rotor portion 44. Similarly, the second rotor portion 44 has the second thickness $T_2$ that is different from the third thickness $T_3$ of the third rotor portion. Further, the first thickness $T_1$, the second thickness $T_2$ and the third thickness $T_3$ are different from one another.

As well, the single ventilation hole 86 of the second rotor portion 44 at the center of the second rotor portion 44, as defined by the inner surface 78 and the projections 74, encircles an exposed portion of the first rotor portion 42. More specifically, the inner section 66 defines an exposed surface or exposed area of the first rotor portion 42. Similarly, the single ventilation hole 106 of the third rotor portion 46 encircles another exposed portion of the first rotor portion 42 on the opposite side of the first rotor portion 42. Since the second rotor portion 44 and the third rotor portion 46 have the same overall shape in the first embodiment, identically shaped opposite surfaces of the inner section 66 are exposed areas that dissipate heat.

More specifically, those surfaces of the inner section 66 of the first rotor portion 42 that are not covered by the projections 74 and 94 are exposed surfaces. Further, as is indicated in FIG. 7, these exposed surfaces of the inner section 66 are encircled by the radius $R_2$ of the annular portion 72 of the second rotor portion 44. In other words, the exposed surfaces of the inner section 66 extend radially inward from the inner surface 78 of the second rotor portion 44. The exposed surfaces of the inner section 66 of the first rotor portion 42, serve as heat dissipating surfaces of the disk brake rotor 40. Specifically, when braking occurs, the brake pads 34 contact the second rotor portion 44 and the third rotor portion 46, generating heat due to friction contact. The exposed surfaces of the inner section 66 of the first rotor portion 42 provide a means for heat dissipation. Thus, the exposed surfaces of the inner section 66 of the first rotor portion 42 cool the rotor assembly 14.

The inner section 66 (the exposed area) of the first rotor portion 42 extends radially inward from the annular portions 72 and 92 of the second rotor portion 44 and the third rotor portion 46. Further, the inner section 66 (the exposed area) of the first rotor portion 42 is located on an annular portion of the first rotor portion 42 and extends radially inward from at least one of the annular portions 72 and 92 of the second rotor portion 44 and the third rotor portion 46.

As indicated in FIG. 7, the outer section 64 of the first rotor portion 42 is concealed by the annular portion 72 of the second rotor portion 44.

Further, additional exposed areas of the first rotor portion 42 are also exposed via the ventilation holes 68, 69, 80, 82, 100 and 102. The ventilation holes 68, 69, 80, 82, 100 and 102 are radially spaced apart from the ventilation holes 86 and 106 of the second and third rotor portions 44 and 46.

Second Embodiment

Figure 10:
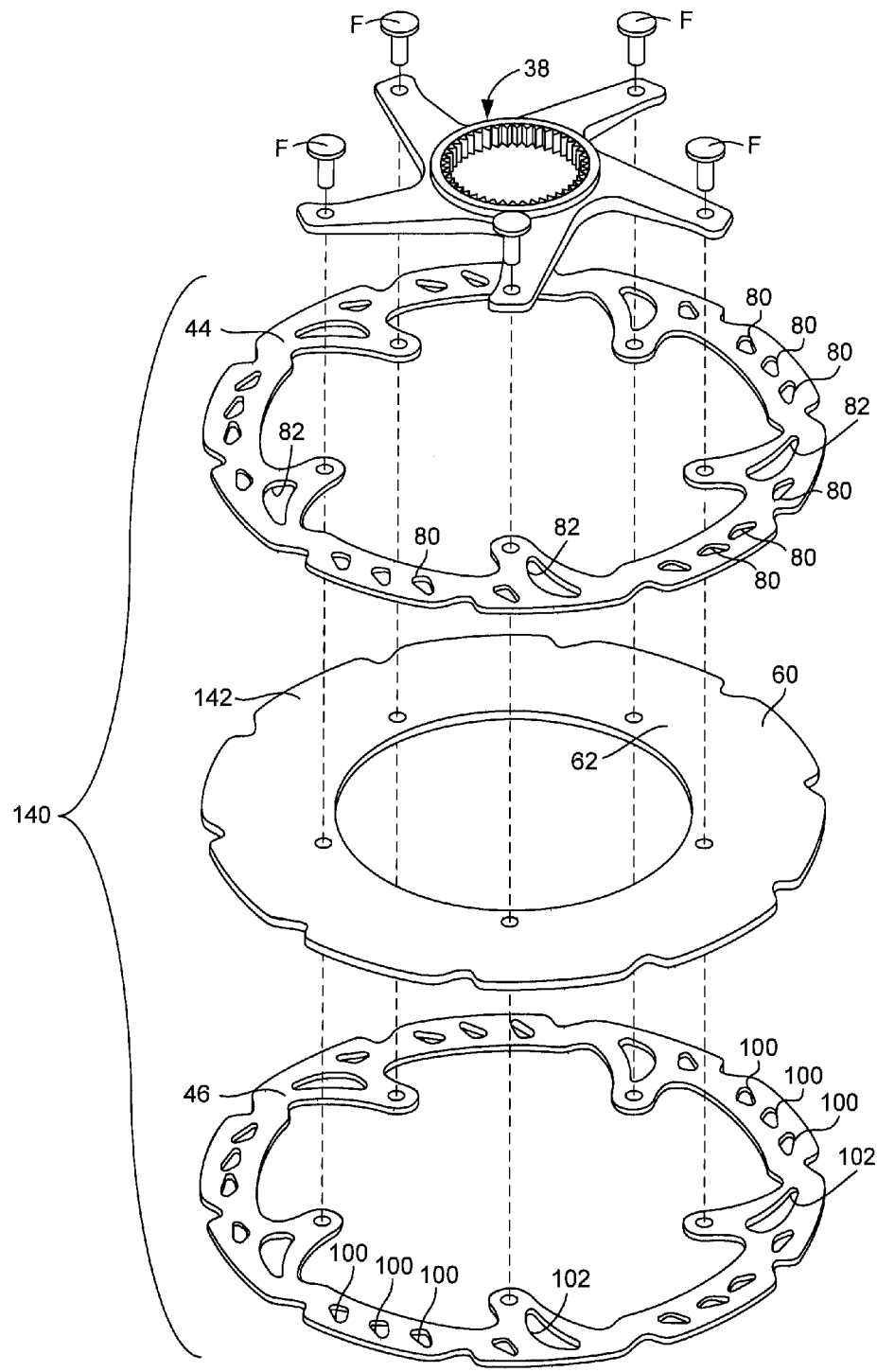
FIG. 10 is another exploded perspective view of a disk brake rotor, showing the first portion, the second portion, the third portion and the hub mounting member, with only the second and third portions having ventilation holes, in accordance with a second embodiment.

Referring now to FIG. 10, a brake disk rotor 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The brake disk rotor 114 includes the hub mounting portion 38 and a rotor assembly 140. The rotor assembly 140 includes a first rotor portion 142 that replaces the first rotor portion 42 of the first embodiment. The rotor assembly 140 also includes the second rotor portion 44 and the third rotor portion 46 of the first embodiment.

The first rotor portion 142 has the same dimensions as the first rotor portion 42 of the first embodiment, except that there are no ventilation holes formed in the first rotor portion 142. Hence, various areas of the first rotor portion 142 are exposed through the ventilation holes 80 and 82 of the second rotor portion 44 and the ventilation holes 100 and 102 of the third rotor portion 46. Thus, there is an overall increase in the exposed surface area of the first rotor portion 142 compared to the first rotor portion 42 of the first embodiment.

Third Embodiment

Figure 11:
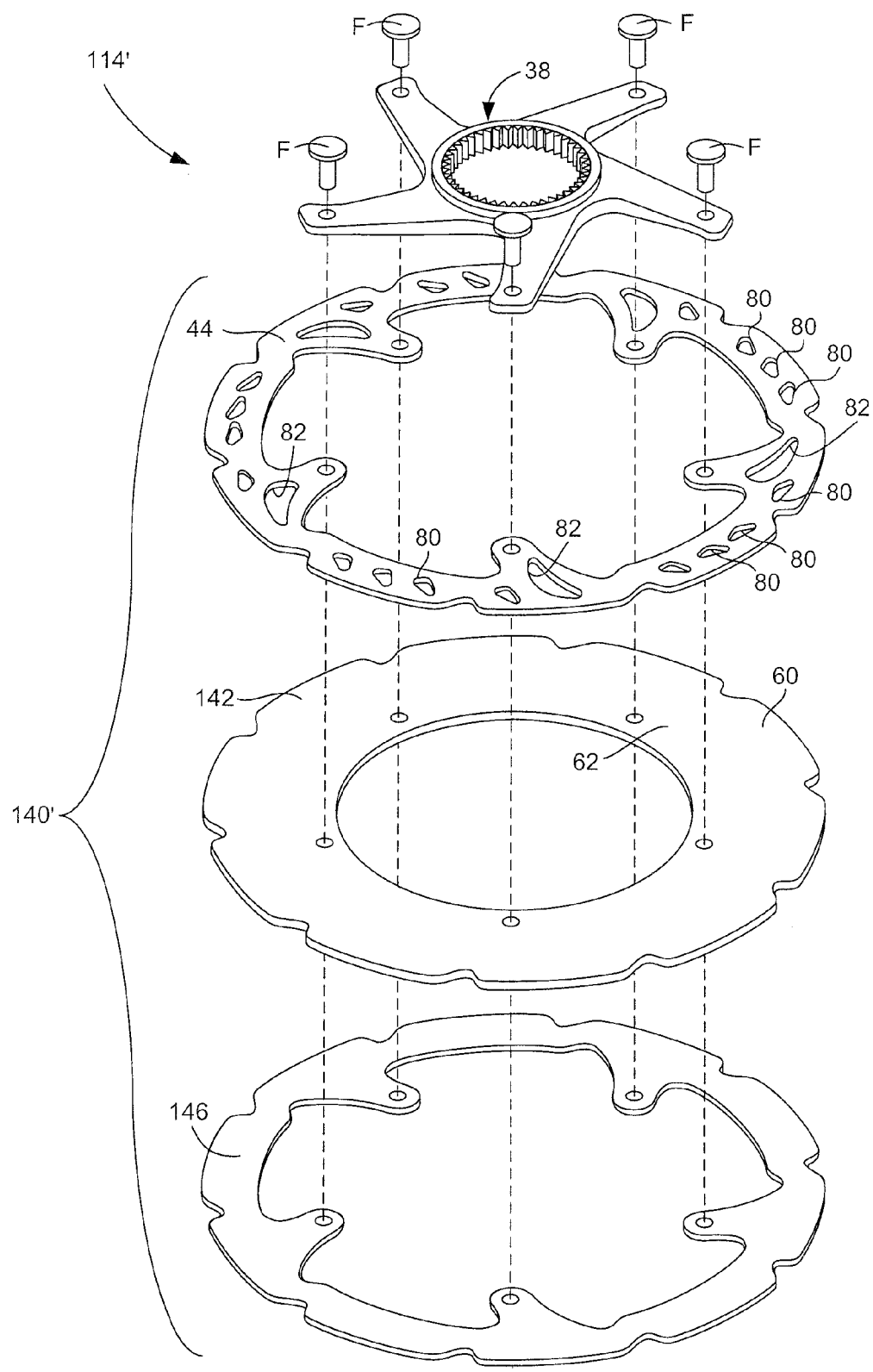
FIG. 11 is another exploded perspective view of a disk brake rotor, showing the first portion, the second portion, the third portion and the hub mounting member, with only the second portion having ventilation holes, in accordance with a third embodiment.

Referring now to FIG. 11, a brake disk rotor 114' in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The brake disk rotor 114' includes the hub mounting portion 38 and a rotor assembly 140'. The rotor assembly 140 includes a first rotor portion 142 that replaces the first rotor portion 42 of the first embodiment. The rotor assembly 140 also includes the second rotor portion 44 of the first embodiment. A third rotor portion 146 replaces the third rotor portion 46 of the first embodiment.

The first rotor portion 142 has the same dimensions as the first rotor portion 42 of the first embodiment, except that there are no ventilation holes formed in the first rotor portion 142. Hence, various areas of the first rotor portion 142 are exposed through the ventilation holes 80 and 82 of the second rotor portion 44. Thus, there is an overall increase in the exposed surface area of the first rotor portion 142 compared to the first rotor portion 42 of the first embodiment.

The third rotor portion 146 has the same dimensions as the third rotor portion 46 of the first embodiment, except that there are no ventilation holes formed in the third rotor portion 146.

Fourth Embodiment

Figure 12:
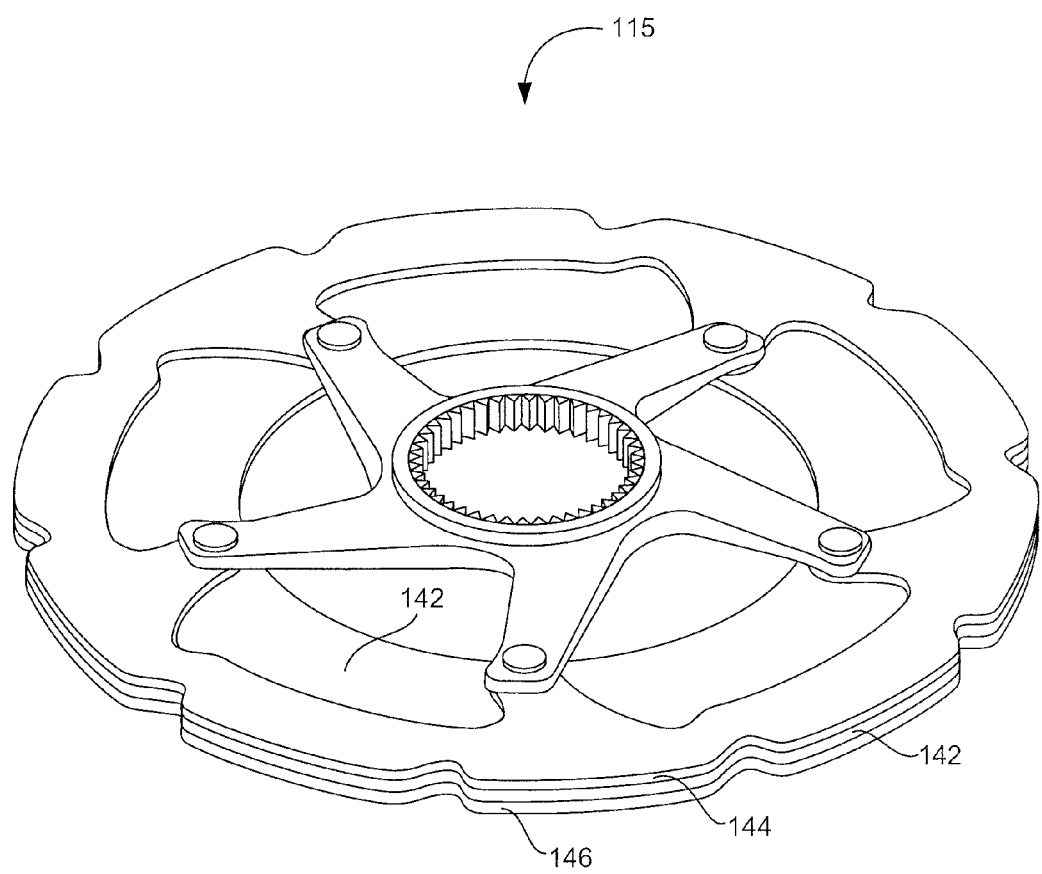
FIG. 12 is a perspective view of a disk brake rotor in accordance with a fourth embodiment.

Referring now to FIG. 12, a brake disk rotor 115 in accordance with a fourth embodiment will now be explained. In view of the similarity between the first, fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The brake disk rotor 115 includes the first rotor portion 142 of the second embodiment, and includes a second rotor portion 144 and the third rotor portion 146 of the third embodiment. The second rotor portion 144 is identical to the second rotor portion 44 of the first embodiment, but does not include the ventilation holes 80 and 82. Similarly, third rotor portion 146 is identical to the third rotor portion 46 of the first embodiment, but does not include the ventilation holes 100 and 102.

Fifth Embodiment

Figure 13:
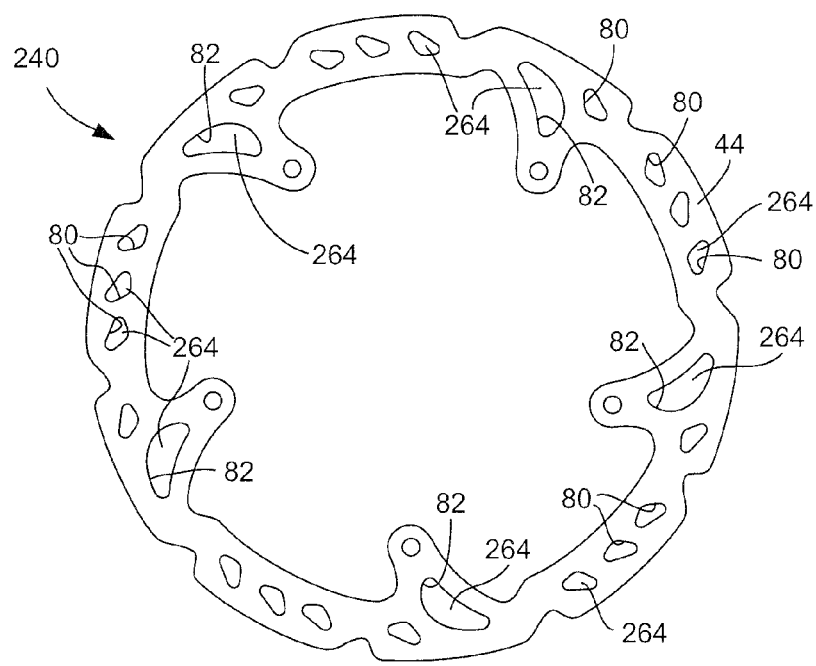
FIG. 13 is a side view of a disk brake rotor showing a first portion and a second portion in accordance with a fifth embodiment.
Figure 14:
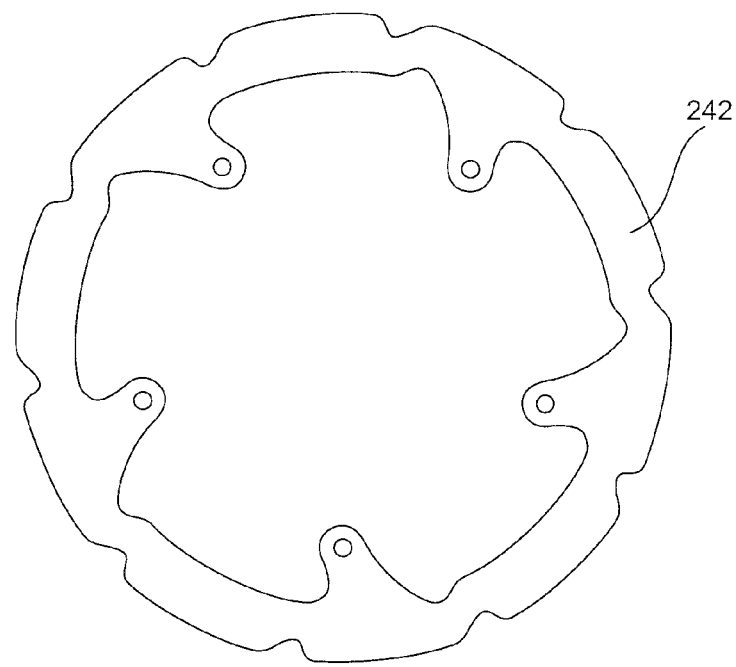
FIG. 14 is a side view of the first portion of the disk brake rotor with the second portion removed in accordance with the fifth embodiment.

Referring now to FIGS. 13 and 14, a rotor assembly 240 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The rotor assembly 240 includes a first rotor portion 242 and the second rotor portion 44 of the first embodiment. The rotor assembly 240 further includes the third rotor portion 46 (not shown in FIGS. 12 and 13). However, the second rotor portion 44 and the third rotor portion 46 have the same relative dimensions (except for thickness) and therefore, description of the second rotor portion 44 also applies to the third rotor portion 46 in the fourth embodiment.

The first rotor portion 242 of the rotor assembly 240 of the fourth embodiment has the same overall dimensions as the second rotor portion 44 (except for thickness). More specifically, the first rotor portion 242 has the same inner radius and profile as the second rotor portion 44. Further the first rotor portion 242 does not have ventilation holes. Therefore, in FIG. 13, the first rotor portion 242 is hidden by the second rotor portion 44 except that areas 264 of the first rotor portion 242 are exposed surfaces, visible through the ventilation holes 80 and 82 of the second rotor portion 44 providing exposed surfaces for heat dissipation. FIG. 14 shows the shape and appearance of the first rotor portion 242.

Sixth Embodiment

Figure 15:
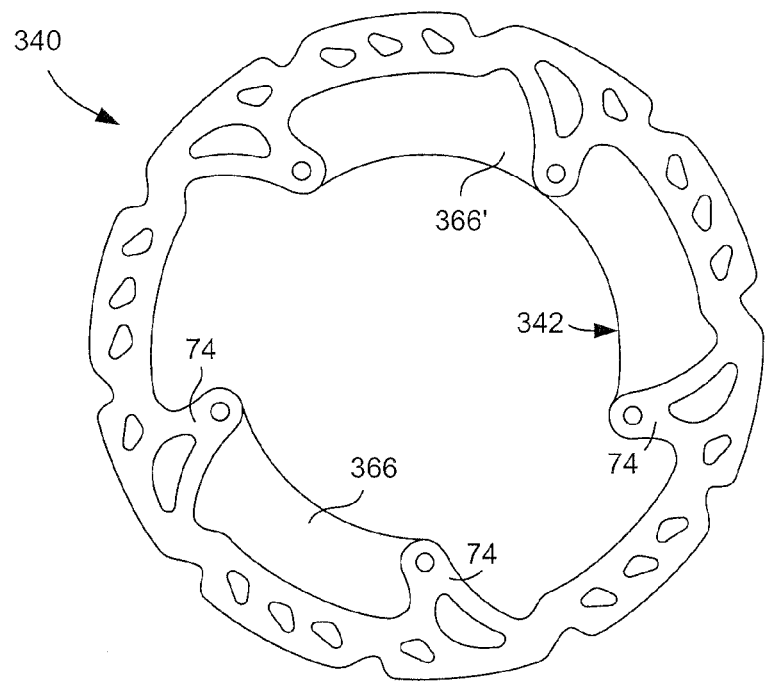
FIG. 15 is a side view of a disk brake rotor showing a first portion and a second portion in accordance with a sixth embodiment.
Figure 16:
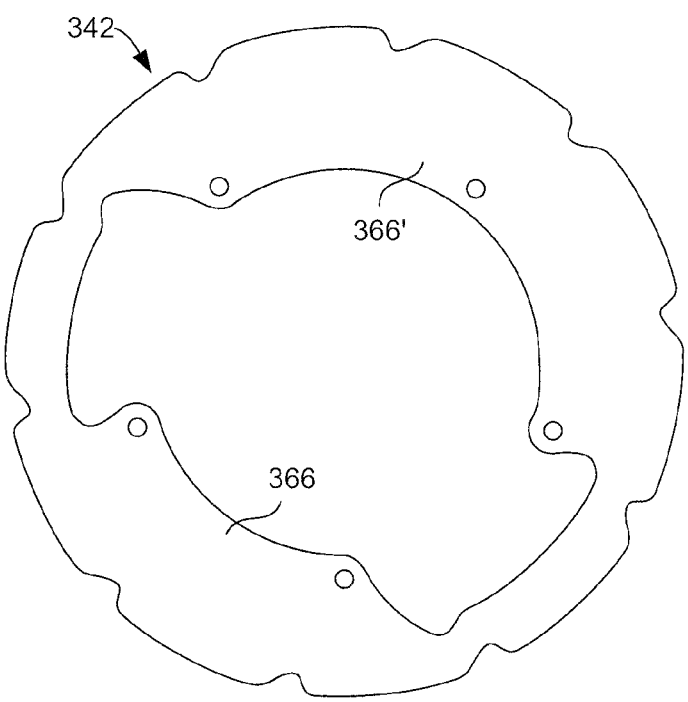
FIG. 16 is a side view of the first portion of the disk brake rotor with the second portion removed in accordance with the sixth embodiment.

Referring now to FIGS. 15 and 16, a rotor assembly 340 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The rotor assembly 340 includes a first rotor portion 342 and the second rotor portion 44 of the first embodiment. The rotor assembly 340 further includes the third rotor portion 46 (not shown in FIGS. 15 and 16). However, the second rotor portion 44 and the third rotor portion 46 have the same relative dimensions (except for thickness) and therefore, description of the second rotor portion 44 also applies to the third rotor portion 46 in the fourth embodiment.

As indicated in FIG. 15, the first rotor portion 342 of the rotor assembly 340 of the fifth embodiment has the same overall dimensions as the second rotor portion 44 (except for thickness) but further includes a first radially inwardly projecting section 366 and a second inwardly projecting section 366'. The first inwardly projecting sections 366 extends arcuately between a pair of the projections 74 of the second rotor portion 44, as shown in FIG. 15. The second inwardly projecting section 366' extends arcuately between three of the projections 74 of the second rotor portion 44. The first inwardly projecting sections 366 and the second inwardly projecting section 366' provide the first rotor portion 342 with an increase in exposed surface areas for improved heat dissipation.

As shown in FIG. 16, the first rotor portion 342 has an irregular shape with the first inwardly projecting sections 366 and the second inwardly projecting section 366'.

Seventh Embodiment

Figure 17:
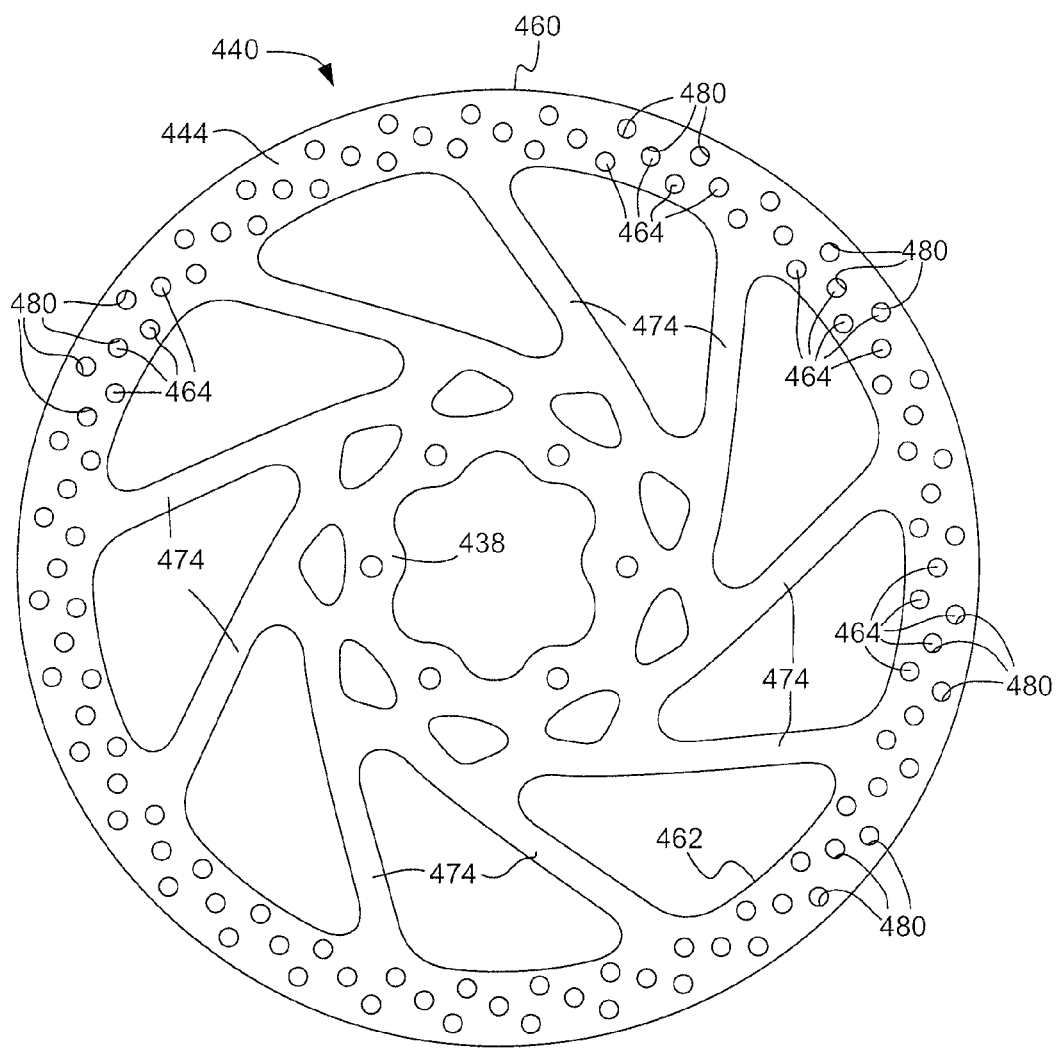
FIG. 17 is a side view of a disk brake rotor in accordance with a seventh embodiment.

Referring now to FIG. 17, a rotor assembly 440 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

The rotor assembly 440 has a different overall shape, compared to the first embodiment. The rotor assembly 440 includes first rotor portion, a second rotor portion 444 and a third rotor portion (not shown) that all have the same relative dimensions. Specifically, the second rotor portion 444 and the rotor assembly 440 have an outer edge surface 460 and inner edge surface 462. The outer edge surface 460 defines an outer radius of the rotor assembly 440 that is larger than an inner radius defined by the inner edge surface 462.

The rotor assembly 440 further includes a plurality of projections 474 that extend radially inwardly to a hub mounting portion 438.

As was the case in the fifth embodiment, the first rotor portion of the rotor assembly 440 has no ventilation holes. However, the second rotor portion 444 includes ventilation holes 480. Consequently, surface sections 464 of the first rotor portion are visible through ventilation holes 480 in the second and third rotor portions. The surfaces 464 are exposed areas that dissipate heat from the rotor assembly 440.

Eighth Embodiment

Figure 18:
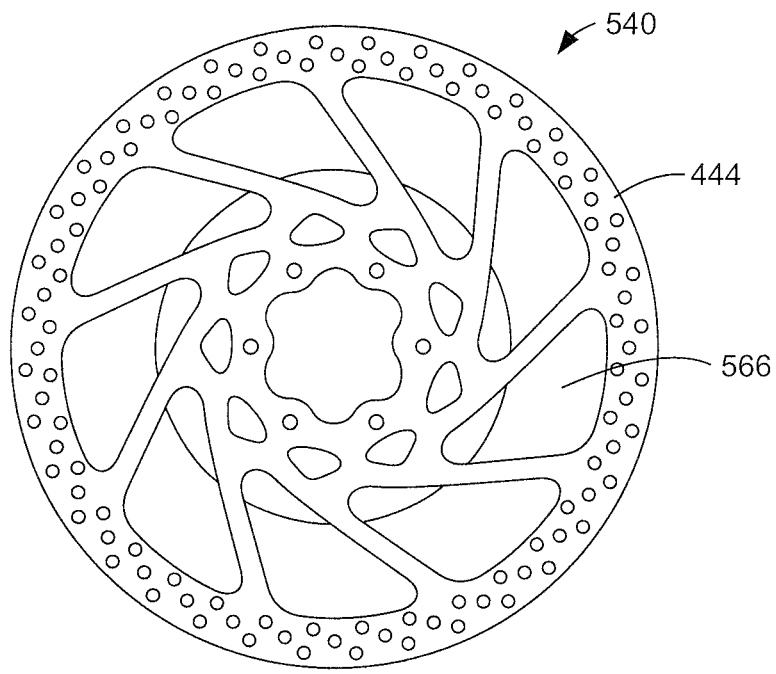
FIG. 18 is a side view of a disk brake rotor in accordance with an eighth embodiment.
Figure 19:
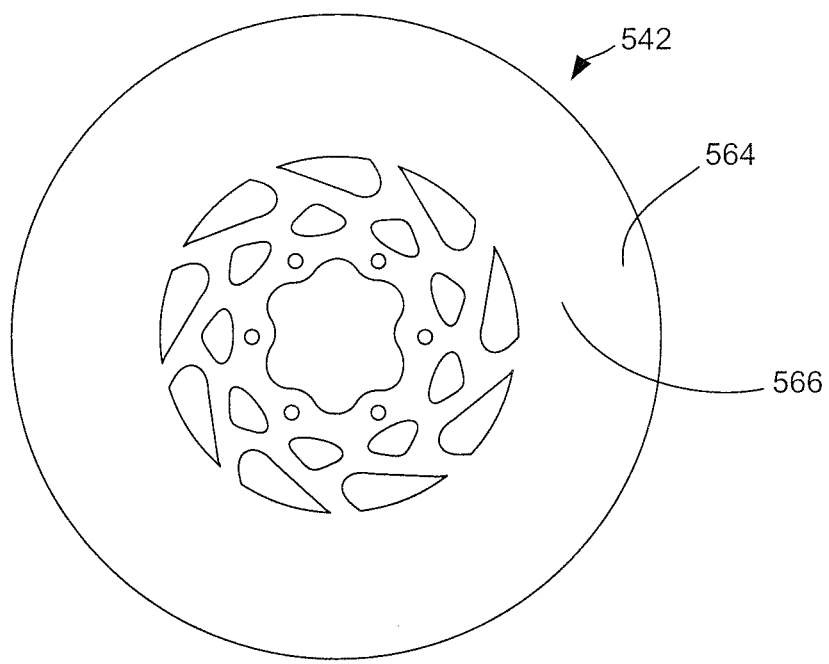
FIG. 19 is a side view of a first portion of the disk brake rotor depicted in FIG. 18, with a second portion shown removed in accordance with the eighth embodiment.

Referring now to FIGS. 18 and 19, a rotor assembly 540 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

The rotor assembly 540 includes a first rotor portion 542, the second rotor portion 444 of the seventh embodiment and a third rotor portion (not shown). The second rotor portion 444 and the third rotor portion (not shown) can have the same overall shape.

As shown in FIG. 19, the first rotor portion 542 includes an outer annular portion that has a radially outer section 564 and a radially inner section 566. The outer section 564 has the same overall dimensions as the outer annular portion of the second rotor portion 444. Consequently, the outer annular portion of the second rotor portion 444 covers the inner section 566 of the first rotor portion 542. However, as shown in FIG. 18, the majority of the surfaces of the inner section 566 are visible. Consequently, the inner section 566 has exposed areas that dissipate heat.

Ninth Embodiment

Figure 20:
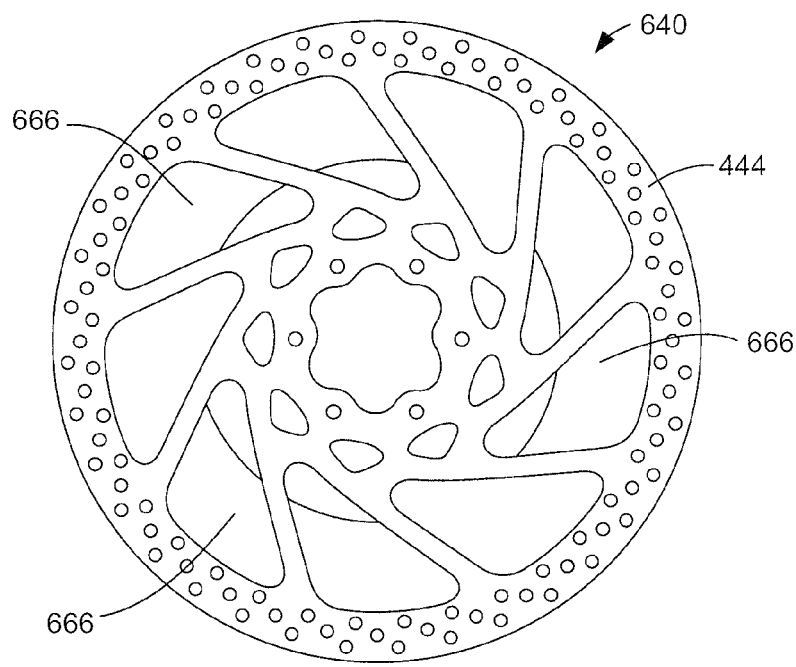
FIG. 20 is a side view of a disk brake rotor in accordance with a ninth embodiment.
Figure 21:
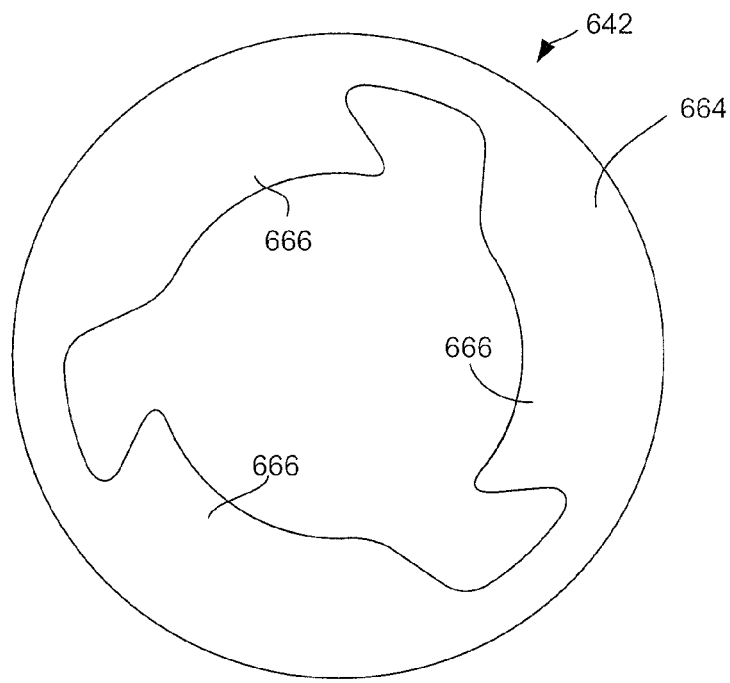
FIG. 21 is a side view of a first portion of the disk brake rotor depicted in FIG. 20, with a second portion shown removed in accordance with the ninth embodiment.

Referring now to FIGS. 20 and 21, a rotor assembly 640 in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

The rotor assembly 640 includes a first rotor portion 642, the second rotor portion 444 of the seventh embodiment and a third rotor portion (not shown). The second rotor portion 444 and the third rotor portion (not shown) can have the same overall shape.

As shown in FIG. 21, the first rotor portion 642 includes an annular portion that has a radially outer section 664 and a plurality of radially inner sections 666. The outer section 664 has the same overall dimensions as the outer annular portion of the second rotor portion 444. Consequently, the outer annular portion of the second rotor portion 444 covers the inner section 666 of the first rotor portion 642. However, as shown in FIG. 20, the majority of the surfaces of the inner sections 666 are visible. Consequently, the inner sections 666 have exposed areas that dissipate heat.

Tenth Embodiment

Figure 22:
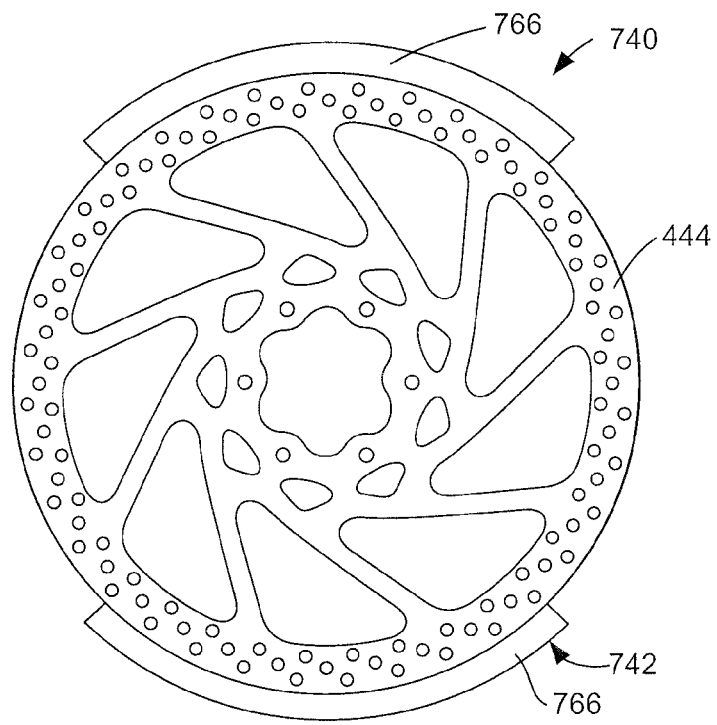
FIG. 22 is a side view of a disk brake rotor in accordance with an tenth embodiment.
Figure 23:
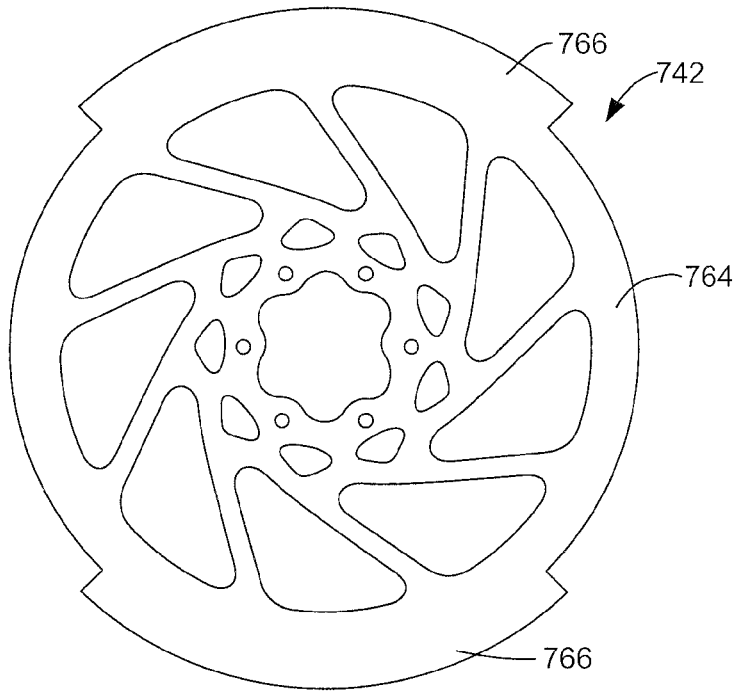
FIG. 23 is a side view of a first portion of the disk brake rotor depicted in FIG. 22, with a second portion shown removed in accordance with the tenth embodiment.

Referring now to FIGS. 22 and 23, a rotor assembly 740 in accordance with a tenth embodiment will now be explained. In view of the similarity between the first and tenth embodiments, the parts of the tenth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

The rotor assembly 740 includes a first rotor portion 742, the second rotor portion 444 of the seventh embodiment and a third rotor portion (not shown). The second rotor portion 444 and the third rotor portion (not shown) can have the same overall shape.

As shown in FIG. 22, the first rotor portion 742 includes an annular portion that has an annular section 764 and a pair of radially outwardly extending sections 766. The annular section 764 has the same overall dimensions as the outer annular portion of the second rotor portion 444. Consequently, the outer annular portion of the second rotor portion 444 covers the annular section 764 of the first rotor portion 642. However, as shown in FIG. 22, the pair of radially outwardly extending sections 766 extend radially outwardly beyond the outer edge of the second rotor portion 444. Hence, the pair of radially outwardly extending sections 766 are visible. Consequently, the radially outwardly extending sections 766 have exposed areas that dissipate heat.

Eleventh Embodiment

Figure 24:
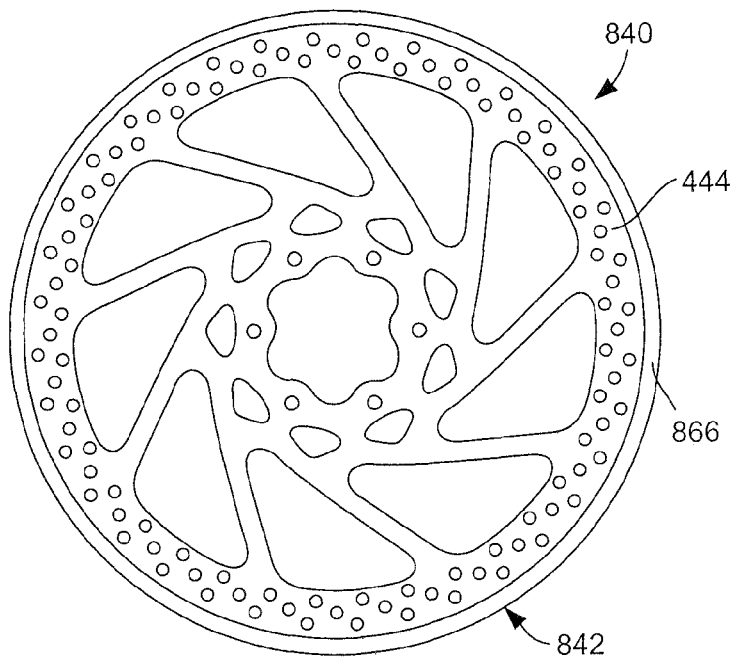
FIG. 24 is a side view of a disk brake rotor in accordance with a eleventh embodiment.
Figure 25:
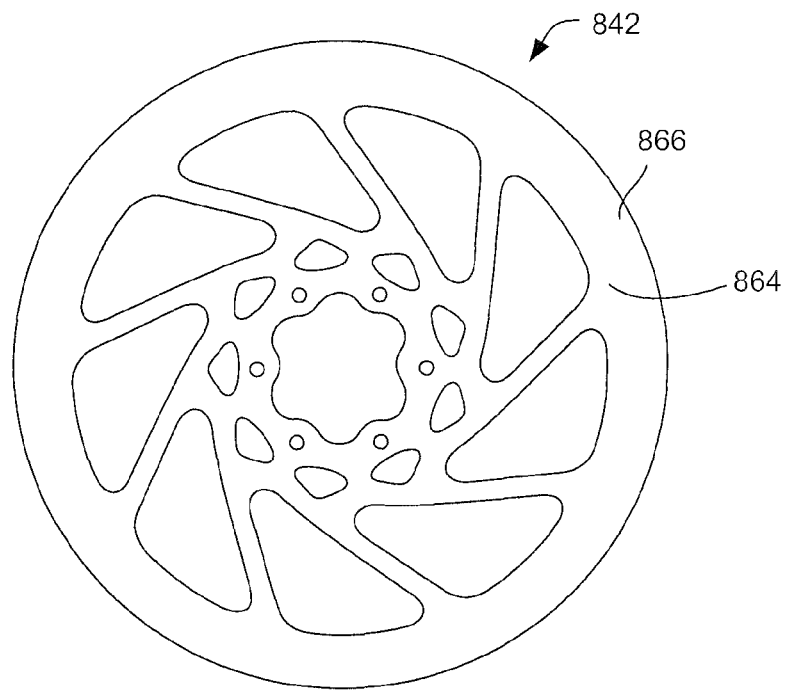
FIG. 25 is a side view of a first portion of the disk brake rotor depicted in FIG. 24, with a second portion shown removed in accordance with the eleventh embodiment.

Referring now to FIGS. 24 and 25, a rotor assembly 840 in accordance with an eleventh embodiment will now be explained. In view of the similarity between the first and eleventh embodiments, the parts of the eleventh embodiment that are identical to the parts of the first embodiment will be given the same reference numerals as the parts of the first embodiment. Moreover, the descriptions of the parts of the eleventh embodiment that are identical to the parts of the first embodiment may be omitted for the sake of brevity.

The rotor assembly 840 includes a first rotor portion 842, the second rotor portion 444 of the seventh embodiment and a third rotor portion (not shown). The second rotor portion 444 and the third rotor portion (not shown) can have the same overall shape.

As shown in FIG. 25, the first rotor portion 842 includes an annular portion that has an annular section 864 and a radially outwardly extending section 866. The annular section 864 has the same overall dimensions as the outer annular portion of the second rotor portion 444. Consequently, the outer annular portion of the second rotor portion 444 covers the annular section 864 of the first rotor portion 842. However, as shown in FIG. 25, the radially outwardly extending section 866 extends radially outwardly beyond the outer edge of the second rotor portion 444. In other words, the first rotor portion 842 has an outer diameter that is greater than the outer diameter of the second rotor portion 444. Hence, the radially outwardly extending section 866 is visible. Consequently, the radially outwardly extending section 866 has exposed areas that dissipate heat.

Twelfth Embodiment

Referring now to FIGS. 26 and 27, a rotor assembly 940 in accordance with an twelfth embodiment will now be explained. In view of the similarity between the first and twelfth embodiments, the parts of the twelfth embodiment that are identical to the parts of the first embodiment will be given the same reference numerals as the parts of the first embodiment. Moreover, the descriptions of the parts of the twelfth embodiment that are identical to the parts of the first embodiment may be omitted for the sake of brevity.

The rotor assembly 940 includes a first rotor portion 942, the second rotor portion 444 of the seventh embodiment and a third rotor portion 946 (shown in FIG. 27).

As shown in FIG. 26, the first rotor portion 942 includes an annular portion that has a central section 964, a radially inner section 966 and a radially outwardly extending section 968. The annular section 964 has the same overall dimensions as the outer annular portion of the second rotor portion 444. Consequently, the outer annular portion of the second rotor portion 444 covers the central section 964 of the first rotor portion 942. Only those surfaces of the central section 964 that are located at ventilation holes 486 are visible in FIG. 26 and define exposed surfaces that dissipate heat.

As shown in FIGS. 26 and 27, the radially inner section 966 extends radially inwardly beyond the inner edge surface 462 of the second rotor portion 444 and the radially outwardly extending section 968 extends radially outwardly beyond the outer edge surface 460 of the second rotor portion 444. In other words, the first rotor portion 942 has an outer diameter that is greater than the outer diameter of the second rotor portion 444 and an inner diameter that is smaller than the inner diameter of the second rotor portion 444. Hence, the radially inner section 966 and the radially outwardly extending section 968 of the first rotor portion 942 are visible. Consequently, the radially inner section 966 and the radially outwardly extending section 968 of the first rotor portion 942 are exposed areas that dissipate heat.

In the twelfth embodiment, the third rotor portion 946 has an outer diameter that is the same as the outer diameter of the second rotor portion 444, as indicated in FIG. 27. However, in the twelfth embodiment, the annular portion of the third rotor portion 946 had an inner diameter that is the same as the annular portion of the first rotor portion 942.

The surface of the first rotor portion 942 that attaches to the second rotor portion 444 is a first attachment area. Further, the surface of the first rotor portion 942 that attaches to the third rotor portion 946 is a second attachment area. As is indicated in FIGS. 26 and 27, the first attachment area has an attaching dimension relative to the second rotor portion 444 that differs from an attaching dimension of the second attachment area relative to the third rotor portion 946.

Thirteenth Embodiment

Referring now to FIG. 28, a rotor assembly 940a in accordance with an thirteenth embodiment will now be explained. In view of the similarity between the first and thirteenth embodiments, the parts of the thirteenth embodiment that are identical to the parts of the first embodiment will be given the same reference numerals as the parts of the first embodiment. Moreover, the descriptions of the parts of the thirteenth embodiment that are identical to the parts of the first embodiment may be omitted for the sake of brevity.

The rotor assembly 940a includes the first rotor portion 942, a second rotor portion 444a and a third rotor portion 946a. The second rotor portion 444a is identical to the second rotor portion 444 of the twelfth embodiment, except that the outer diameter of the second rotor portion 444a is the same as the outer diameter of the first rotor portion 942. The third rotor portion 946a is the same as the third rotor portion 946 of the twelfth embodiment, except that the inner diameter of the annular portion of the third rotor portion 946a is the same as the inner diameter of the annular portion of the second rotor portion 444a (and second rotor portion 444 of the twelfth embodiment).

Fourteenth Embodiment

Referring now to FIG. 29, a rotor assembly 940b in accordance with an fourteenth embodiment will now be explained. In view of the similarity between the first and fourteenth embodiments, the parts of the fourteenth embodiment that are identical to the parts of the first embodiment will be given the same reference numerals as the parts of the first embodiment. Moreover, the descriptions of the parts of the fourteenth embodiment that are identical to the parts of the first embodiment may be omitted for the sake of brevity.

The rotor assembly 940b includes the first rotor portion 942, the second rotor portion 444a and a third rotor portion 946b. The third rotor portion 946a is the same as the third rotor portion 946a of the thirteenth embodiment, except that the inner diameter of the annular portion of the third rotor portion 946a is smaller than the inner diameter of the annular portion of the second rotor portion 444a (and second rotor portion 444 of the twelfth embodiment) but is larger than the inner diameter of the annular portion of the first rotor portion 942.

Fifteenth Embodiment

Referring now to FIG. 30, a rotor assembly 940c in accordance with an fifteenth embodiment will now be explained. In view of the similarity between the first and fifteenth embodiments, the parts of the fifteenth embodiment that are identical to the parts of the first embodiment will be given the same reference numerals as the parts of the first embodiment. Moreover, the descriptions of the parts of the fifteenth embodiment that are identical to the parts of the first embodiment may be omitted for the sake of brevity.

The rotor assembly 940b includes the first rotor portion 942, the second rotor portion 444 and the third rotor portion 946b.

As shown in the thirteenth, fourteenth and fifteenth embodiments, the inner and outer diameters of the annular portions of the second rotor portion and the third rotor portion of the depicted rotor assemblies can be varied.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the disk brake rotor. Accordingly, these terms, as utilized to describe the disk brake rotor should be interpreted relative to a bicycle equipped with the disk brake rotor as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A disk brake rotor comprising:
    a first rotor layer having a surface that extends in a direction perpendicular to a rotational axis thereof;
    a second rotor layer having an annular portion and at least one ventilation hole; and
    a third rotor layer having an annular portion,
    the first rotor layer being attached to and disposed between the second rotor layer and the third rotor layer with a portion of the surface of the first rotor layer having an exposed area that is exposed by the at least one ventilation hole.

2. The disk brake rotor according to claim 1, wherein
    the first rotor layer has a first attachment area attached to the annular portion of the second rotor layer, and a second attachment area attached to the annular portion of the third rotor layer.

3. The disk brake rotor according to claim 2, wherein
    the exposed area of the first rotor layer extends radially inward from at least one of the annular portions of the second rotor layer and the third rotor layer.

4. The disk brake rotor according to claim 2, wherein
    the exposed area of the first rotor layer is located on an annular portion of the first rotor layer and extends radially inward from at least one of the annular portions of the second rotor layer and the third rotor layer.

5. The disk brake rotor according to claim 4, wherein the first rotor layer includes a second exposed area having an annular shape extending radially outward from at least one of the annular portions of the second rotor layer and the third rotor layer.

6. The disk brake rotor according to claim 2, wherein the first rotor layer includes a second exposed area that extends radially outward relative to at least one of the annular portions of the second rotor layer and the third rotor layer.

7. The disk brake rotor according to claim 2, wherein the first rotor layer includes a second exposed area that has an annular shape and extends radially outward relative to at least one of the annular portions of the second rotor layer and the third rotor layer.

8. The disk brake rotor according to claim 2, wherein the first attachment area has an attaching dimension relative to the second rotor layer that differs from an attaching dimension of the second attachment area relative to the third rotor layer.

9. The disk brake rotor according to claim 1, wherein the annular portion of second rotor layer has a radius greater that a radius of the annular portion of the third rotor layer.

10. The disk brake rotor according to claim 1, wherein
    the first rotor layer has a first thickness and the second rotor layer has a second thickness that is different from the first thickness.

11. The disk brake rotor according to claim 1, wherein
    the second rotor layer has a second thickness and the third rotor layer has a third thickness that is different from the second thickness.

12. The disk brake rotor according to claim 1, wherein
    the first rotor layer has a first thickness, the second rotor layer has a second thickness and the third rotor layer has a third thickness, the first, second and third thicknesses being different from one another.

13. The disk brake rotor according to claim 1, wherein
    the annular portion of the third rotor layer includes at least one ventilation hole.

* * * * *